United States Patent [19]
Tremblay

[11] Patent Number: 5,992,166
[45] Date of Patent: Nov. 30, 1999

[54] MOTORIZED DAMPER FOR REFRIGERATOR

[75] Inventor: Dennis D. Tremblay, Morrison, Ill.

[73] Assignee: General Electric Company, Schenectady, N.Y.

[21] Appl. No.: 09/012,110

[22] Filed: Jan. 22, 1998

[51] Int. Cl.[6] .................................................. F25D 17/04
[52] U.S. Cl. ............................................ 62/187; 236/49.3
[58] Field of Search .............................. 62/187, 186, 203, 62/208, 209; 236/49.3

[56] References Cited

U.S. PATENT DOCUMENTS 5,018,364   5/1991   Chesnut et al. .............................. 62/187
5,477,699  12/1995   Guess et al. ................................. 62/187

*Primary Examiner*—Harry B. Tanner
*Attorney, Agent, or Firm*—Carl B. Horton, Esq.

[57] ABSTRACT

A motorized damper and a control circuit for controlling the damper motor are described. More specifically, and in one embodiment, the control circuit includes a fresh food compartment cold control (FFCC) thermostatic switch, sometimes referred to herein as the FFCC thermostat. The temperature in the refrigerator fresh food compartment is measured by the FFCC thermostat, and when the FFCC thermostat determines that the temperature in the fresh food compartment is too warm, the FFCC thermostat closes providing a signal which energizes the damper motor. When the damper motor is energized, the motor rotates a cam which moves the damper door from a closed position to an open position. When the FFCC thermostat senses that the temperature in the fresh food compartment is acceptable, the FFCC thermostat opens which causes the motor to rotate the cam to close the damper door.

19 Claims, 8 Drawing Sheets

MOTORIZED DAMPER FOR REFRIGERATOR

FIELD OF THE INVENTION

This invention relates generally to refrigerators and, more particularly, to controlling air flow between the freezer compartment and the fresh food compartment.

BACKGROUND OF THE INVENTION

Household refrigerators generally utilize a simple vapor compression cycle for cooling air. Such a cycle includes a compressor, a condenser, an expansion device, and an evaporator connected in series and charged with a refrigerant. The evaporator is a type of heat exchanger which transfers heat from air passing over the evaporator to a refrigerant flowing through the evaporator, thereby causing the refrigerant to vaporize. The cooled air is used to refrigerate one or more refrigerator compartments.

A typical household side-by-side refrigerator includes a freezer storage compartment and a fresh food storage compartment arranged side-by-side and separated by a center mullion wall. Shelves and drawers typically are provided in the fresh food compartment, and shelves and wire baskets typically are provided in the freezer compartment. In addition, an ice maker may be provided in the freezer compartment. A freezer door and a fresh food door close the access openings to the freezer and fresh food compartments, respectively.

An evaporator chamber typically is located in the freezer compartment, and the evaporator chamber is substantially separated from the food storage portion of the freezer compartment by an evaporator chamber wall. The evaporator is located in the evaporator chamber, and a fan typically is located near an opening in an upper portion of the evaporator chamber wall. In operation, the fan draws air up through the evaporator chamber and injects cooled air into the food storage portion of the freezer compartment. The cooled air from the evaporator chamber also is supplied to the fresh food compartment by a duct which is located at the top rear portion of the fresh food compartment and is in air flow communication with the evaporator chamber.

In the past, and to control the temperature in the fresh food compartment, a manual damper was located in the duct in the fresh food compartment. By selecting a position for the damper, the amount of cool air passed from the freezer compartment into the fresh food compartment could be controlled. For example, as the damper was moved closer to a fully open position, more cooled air was passed into the fresh food compartment, and as the damper was moved closer to a fully closed position, less cooled air was passed into the fresh food compartment.

To improve temperature control, actuators have been included in side-by-side refrigerators to control the extent of air flow into the fresh food compartment. The actuator typically includes a thermo-mechanical or electric damper, and the actuator is located in an air duct in the fresh food compartment. The actuator is responsive to air temperature, and the amount of air flow allowed through the damper depends on the temperature at the actuator. Although such actuators provide acceptable air flow control, it is possible to improperly position the damper. Of course, improperly positioning the damper results in undesired warming or cooling of the fresh food compartment.

SUMMARY OF THE INVENTION

These and other objects may be attained by a motorized damper and a control circuit for controlling the energization and de-energization of the damper motor. More specifically, and in one embodiment, the control circuit includes a fresh food compartment cold control (FFCC) thermostatic switch, sometimes referred to herein as the FFCC thermostat. The temperature in the refrigerator fresh food compartment is measured by the FFCC thermostat, and when the FFCC thermostat determines that the temperature in the fresh food compartment is too warm, the FFCC thermostat closes providing a signal which energizes the damper motor. When the damper motor is energized, the motor rotates a cam which moves the damper door from a closed position to an open position. When the FFCC thermostat senses that the temperature in the fresh food compartment is acceptable, the FFCC thermostat opens which causes the motor to rotate the cam to close the damper door.

The damper motor runs until the damper door is in a synchronous open or closed position with that of the FFCC thermostat. By providing that the damper motor is energized until the damper door is in the synchronous open or closed position as described above, rapid adjustments of the thermostat temperature settings by a user do not cause undesired effects. Specifically, the damper door will not stop in an intermediate position between the fully opened and fully closed position. Therefore, no undesirable warming or cooling of the fresh food compartment may occur.

DETAILED DESCRIPTION

Figure 1:
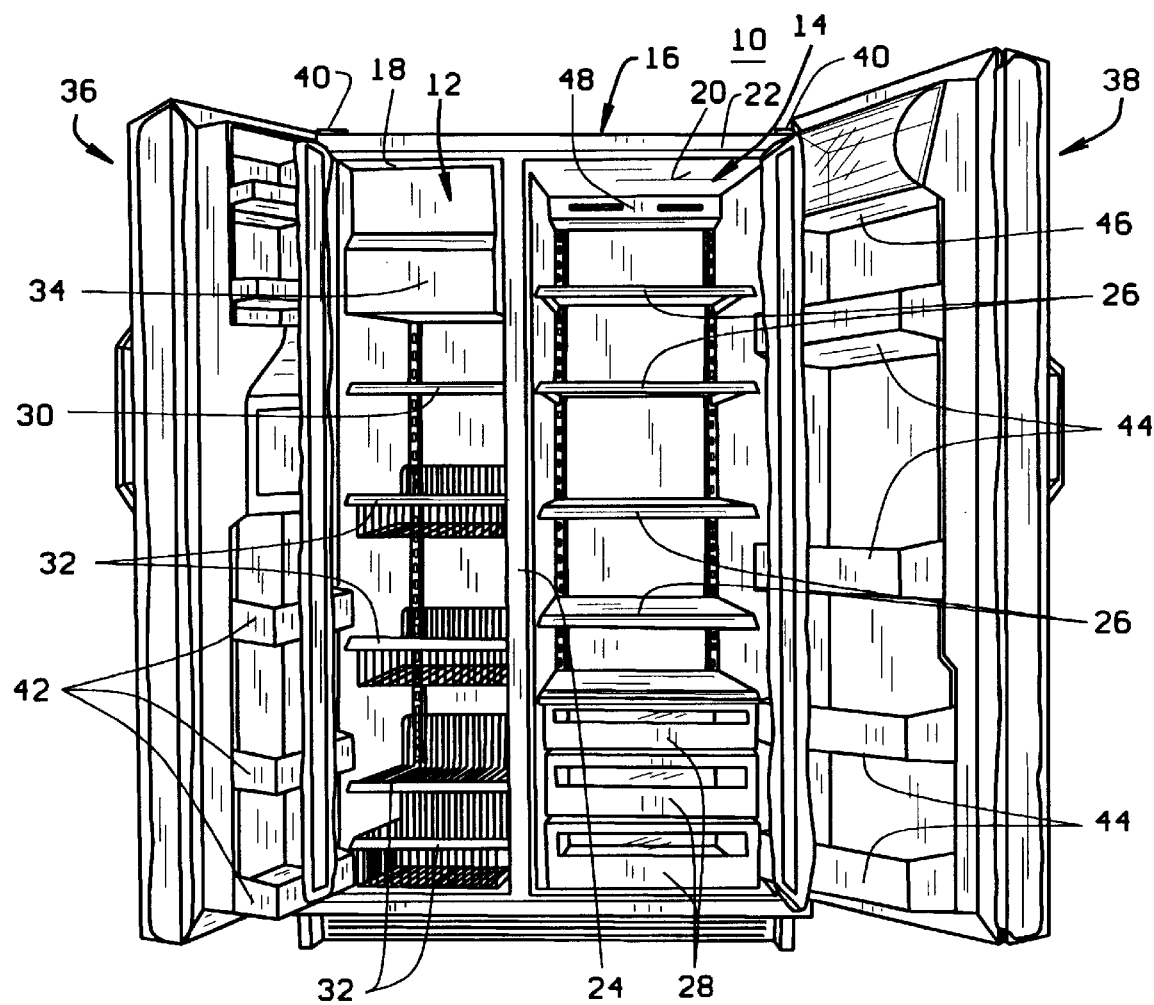
FIG. 1 is a front perspective view of a known side-by-side refrigerator with the access doors open.

FIG. 1 is a front perspective view of a side-by-side refrigerator 10 including a freezer storage compartment 12 and a fresh food storage compartment 14. Freezer compartment 12 and fresh food compartment 14 are arranged side-by-side. A side-by-side refrigerator such as refrigerator 10 is commercially available from General Electric Company, Appliance Park, Louisville, Ky. 40225. Although the motorized damper is described herein in the context of a side-by-side refrigerator, it should be understood that the damper could be used in other refrigerator types such as top mount refrigerators.

Refrigerator 10 includes an outer case 16 and inner liners 18 and 20. The space between case 16 and liners 18 and 20, and between liners 18 and 20, is filled with foamed-in-place insulation. Outer case 16 normally is formed by folding a sheet of a suitable material, such as pre-painted steel, into an inverted U-shape to form the top and side walls of case 16. The bottom wall of case 16 normally is formed separately and attached to the side walls and to a bottom frame that provides support for refrigerator 10. Inner liners 18 and 20 are molded from a suitable plastic material to form freezer compartment 12 and fresh food compartment 14, respectively. Alternatively, liners 18 and 20 may be formed by bending and welding a sheet of a suitable metal, such as steel. The illustrative embodiment includes two separate liners 18 and 20 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 22 extends between the case front flange and the outer front edges of liners 18 and 20. Breaker strip 22 is formed from a suitable resilient material, such as an extruded acrylo-butadiene-syrene based material (commonly referred to as ABS).

The insulation in the space between liners 18 and 20 is covered by another strip to suitable resilient material 24, which also commonly is referred to as the mullion. Mullion 24 also preferably is formed of an extruded ABS material. It will be understood that in a refrigerator with a separate mullion dividing an unitary liner into a freezer and a fresh food compartment, the front face member of that mullion corresponds to mullion 24. Breaker strip 22 and mullion 24 form a front face, and extend completely around the inner peripheral edges of case 16 and vertically between liners 18 and 20. Mullion 24, insulation between compartments 12 and 14, and the spaced wall of liners 18 and 20 separating compartments 12 and 14, sometimes are collectively referred to herein as the center mullion wall.

Shelves 26 and drawers 28 normally are provided in fresh food compartment 14 to support items being stored therein. Similarly, shelves 30 and wire baskets 32 are provided in freezer compartment 12. In addition, an ice maker 34 may be provided in freezer compartment 12.

A freezer door 36 and a fresh food door 38 close the access openings to freezer and fresh food compartments 12 and 14, respectively. Each door 36 and 38 is mounted by a top hinge 40 and a bottom hinge (not shown) to rotate about its outer vertical edge between an open position, as shown in FIG. 1, and a closed position closing the associated storage compartment. Freezer door 36 includes a plurality of storage shelves 42, and fresh food door 38 also includes a plurality of storage shelves 44 and a butter storage bin 46.

With respect to the flow of air in refrigerator 10, an evaporator chamber typically is located in freezer compartment 12, and the evaporator chamber is substantially separated from the food storage portion of freezer compartment 12 by an evaporator chamber wall. An evaporator is located in the evaporator chamber, and a fan typically is located near an opening in an upper portion of the evaporator chamber wall. In operation, the evaporator fan draws air up through the evaporator chamber and injects cooled air into the food storage portion of freezer compartment 12. The cooled air from the evaporator chamber also is supplied to fresh food compartment 14 through a duct 48 located at the top rear portion of fresh food compartment 14, in air flow communication with the evaporator chamber.

The motorized damper described herein may be located in duct 48 to regulate the temperature of fresh food compartment 14. In one embodiment, the motorized damper includes a motor, a cam driven by the motor, a damper door positioned by the cam, switches for controlling motor operation, and a housing. The damper regulates the flow of colder air from freezer compartment 12 into fresh food compartment 14 with the purpose of managing the temperature in the fresh food compartment.

Figure 2:
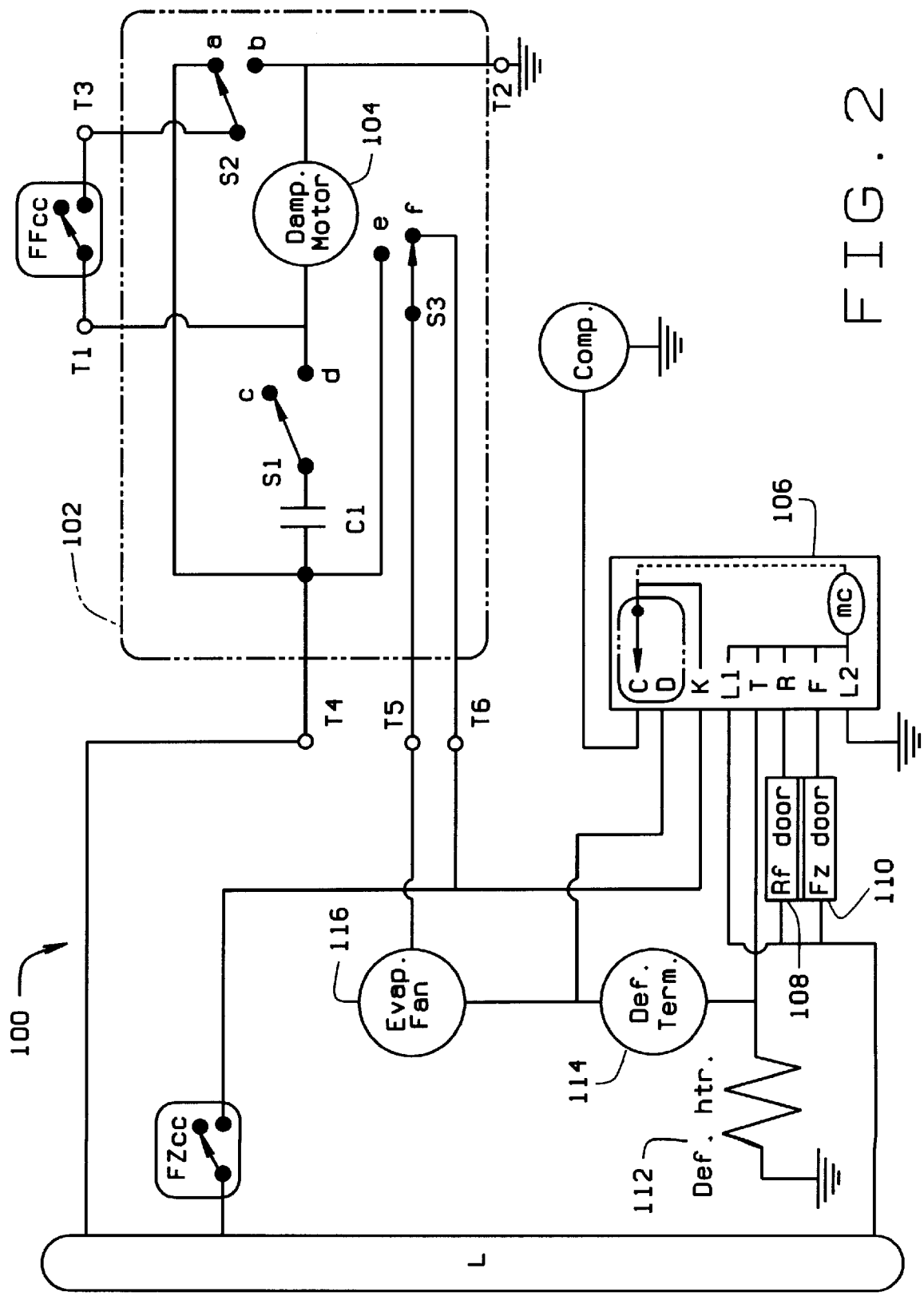
FIG. 2 illustrates a control circuit in accordance with one embodiment of the present invention under stable conditions.

FIG. 2 is a schematic diagram of a control circuit 100 electrically coupled to a damper unit 102, which unit 102 is sometimes referred to herein as the motorized damper. Control circuit 100 includes a freezer cold control thermostatic switch FZCC, a fresh food cold control thermostatic switch FFCC, and a switch unit 106. Power is supplied to the components of control circuit by a power supply load L.

Damper unit 102 includes damper motor 104 coupled to switches S1, S2, and S3. Switch S1 includes contacts c and d, switch S2 includes contacts a and b, and switch S3 includes contacts e and f. A capacitor C1 is connected in series with switch S1. Damper unit 102 also includes terminals T1, T2, T3, T4, T5, and T6. Terminal T1 is coupled to contact d of switch S1 and damper motor 104. Terminal T2 is coupled to ground. Terminal 3 is coupled to switch S2. Terminal T4 is coupled to capacitor C1. Terminal T5 is coupled to switch S3, and terminal T6 is coupled to contact f of switch S3.

Switch FZCC is coupled to terminal T6 of damper unit 102 and to a K input of switch unit 106. Switch FFCC is coupled between terminals T1 and T3 of damper unit 102. Freezer door sensor 108 and fresh food door sensor 110 are connected to the F and R inputs of switch unit 106. A defrost heater element 112 and a defrost thermistor 114 are coupled to the T input of switch unit 106. Defrost thermistor 114 also is connected to an evaporator fan 116, and the common connection between defrost thermistor 114 and evaporator fan 116 is connected to the D input of switch unit 106. Evaporator fan 116 also is connected to terminal T5 of damper unit 102. A compressor 118 is connected between ground and the C input of switch unit 106.

Generally, the temperature in fresh food compartment 14 is measured by switch FFCC, sometime referred to herein as the FFCC thermostat. When the FFCC thermostat determines that the temperature in fresh food compartment 14 is too warm, it closes providing a signal which energizes damper motor 104 to rotate the cam and move the damper door from a closed position to an open position. When the FFCC thermostat senses that the temperature in fresh food compartment 14 is acceptable, it opens which causes motor 104 to rotate the cam to close the damper door. The FFCC thermostat may be an electromechanical SPST type switch such that when the FFCC thermostat is on, the contacts are closed and when the FFCC thermostat is off, the contacts are open. A SPST cold control that operates in an opposite manner also could be utilized. Motor 104 runs until the damper door is in a synchronous open or closed position with that of the FFCC thermostat. Specifically, switches S1 and S2 have no effect on operation of motor 104 when the damper is being moved between the open position and the closed position.

Switch S3, which sometimes is referred to herein as an auxiliary switch, is provided for driving evaporator circulating fan 116 when the damper is open and when the FZCC thermostat is open. The FFCC thermostat is in series with damper motor 104 and in parallel with evaporator fan 116. When the FFCC thermostat opens, fan 116 stays "on" until damper motor 104 sufficiently rotates the cam to change the state of auxiliary switch S3.

More specifically, and referring to FIG. 2, control circuit 100 and damper unit 102 are shown in a stable condition. In the stable condition, switch S1 is in open position (c), switch S2 is in position (a) and switch S3 is in position (f) so that evaporator fan 116 is driven by the FZCC thermostat. With switches S1, S2, and S3 in these positions, damper motor 104 is not energized.

Figure 3:
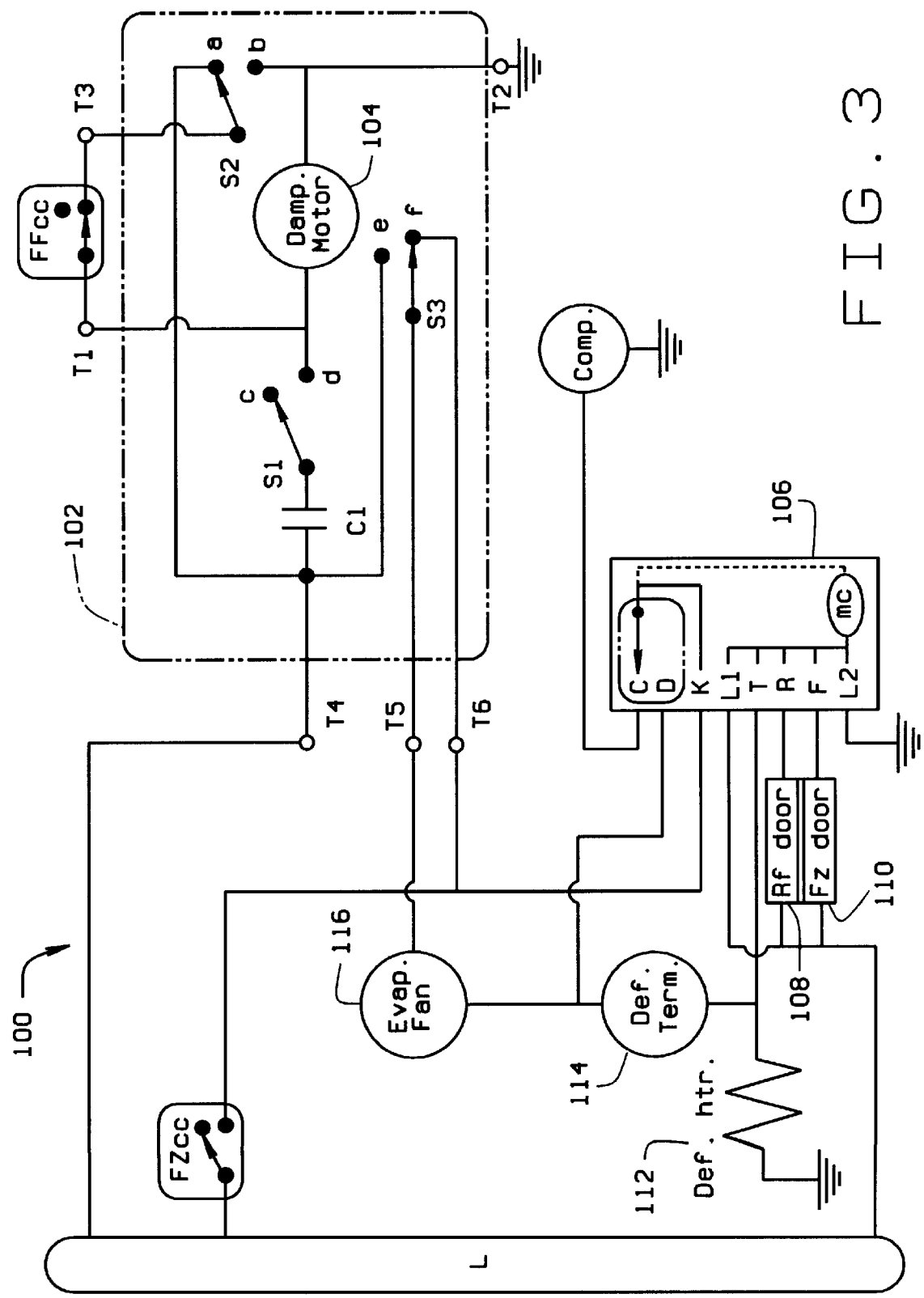
FIGS. 3–7 illustrate the control circuit shown in FIG. 1 under various operating conditions.

Referring now to FIG. 3, when the FFCC thermostat closes indicating a demand for cold air in fresh food compartment 14, a circuit path is completed through the FFCC thermostat and switch S2 to energize damper motor 104. At this point, capacitor C1 is by-passed and open circuited.

Figure 4:
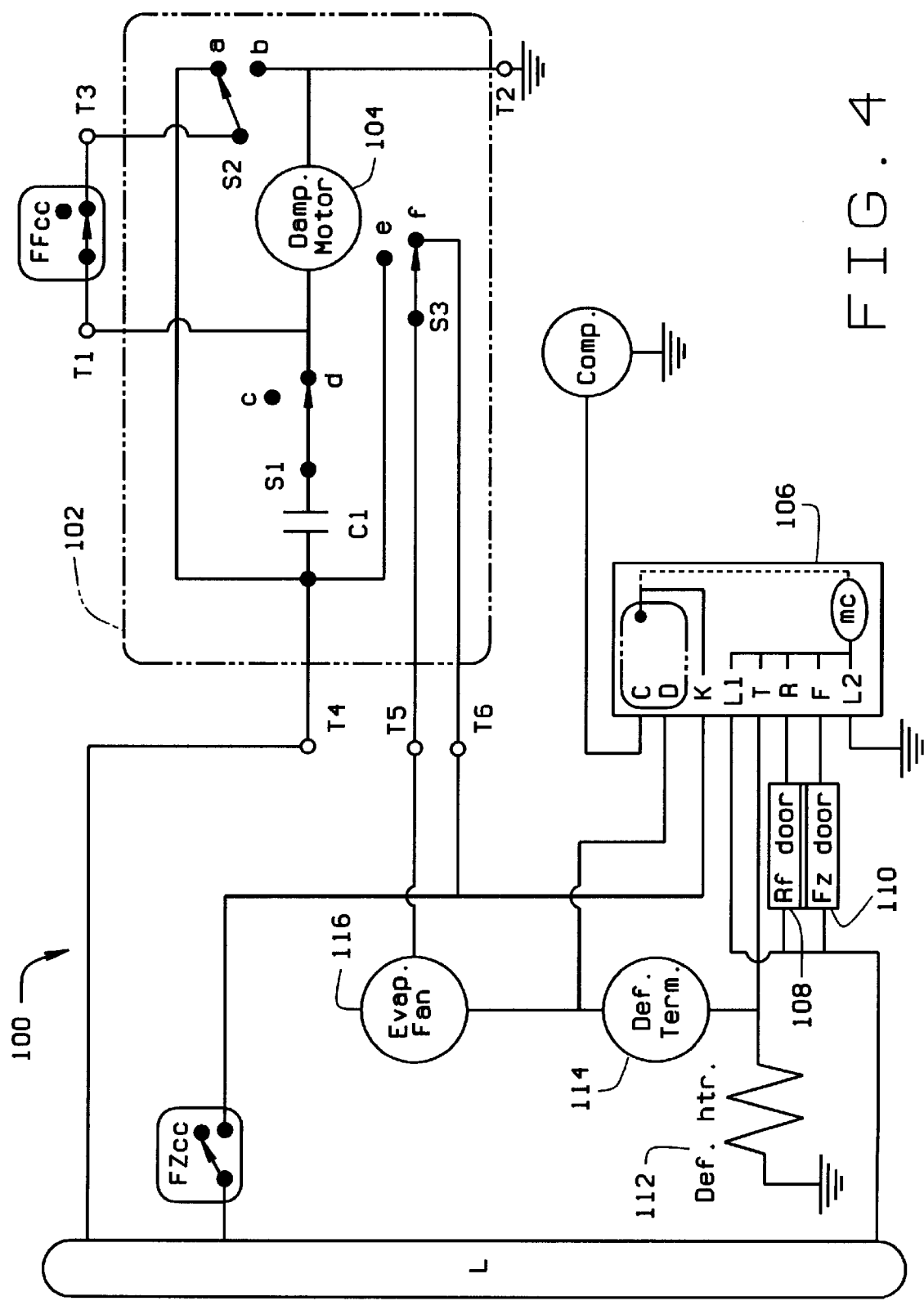
Figure 5:
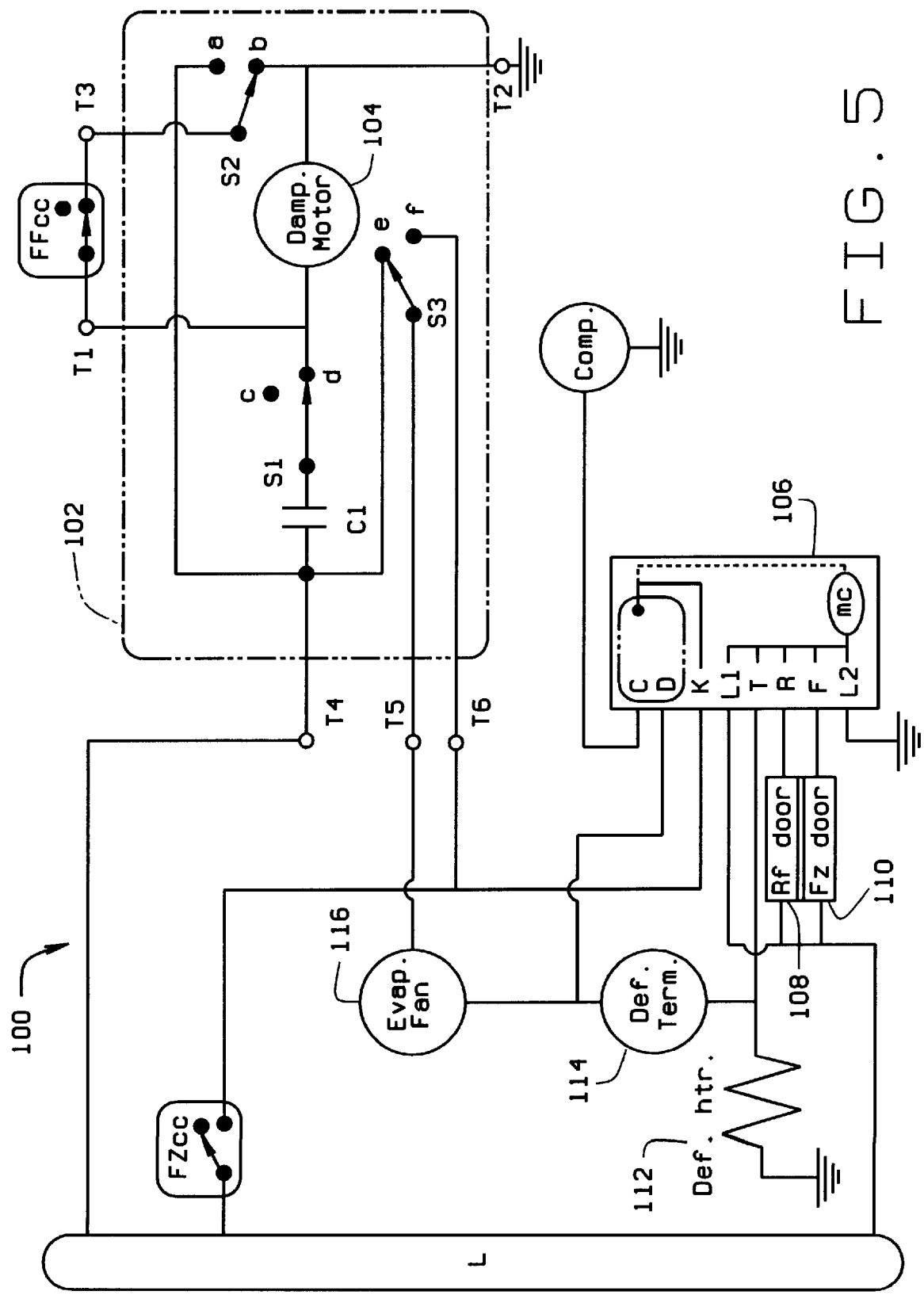

As shown in FIG. 4, when damper motor 104 is energized, damper motor 104 will rotate the cam causing switch S1 to close to position (d) and causing the damper door to open. When the door has reached its full open position, and referring to FIG. 5, switch S2 is caused to move to position (b) and switch S3 is caused to move to position (e) by the cam. At this point, capacitor C1 is not in series with damper motor 104.

Figure 6:
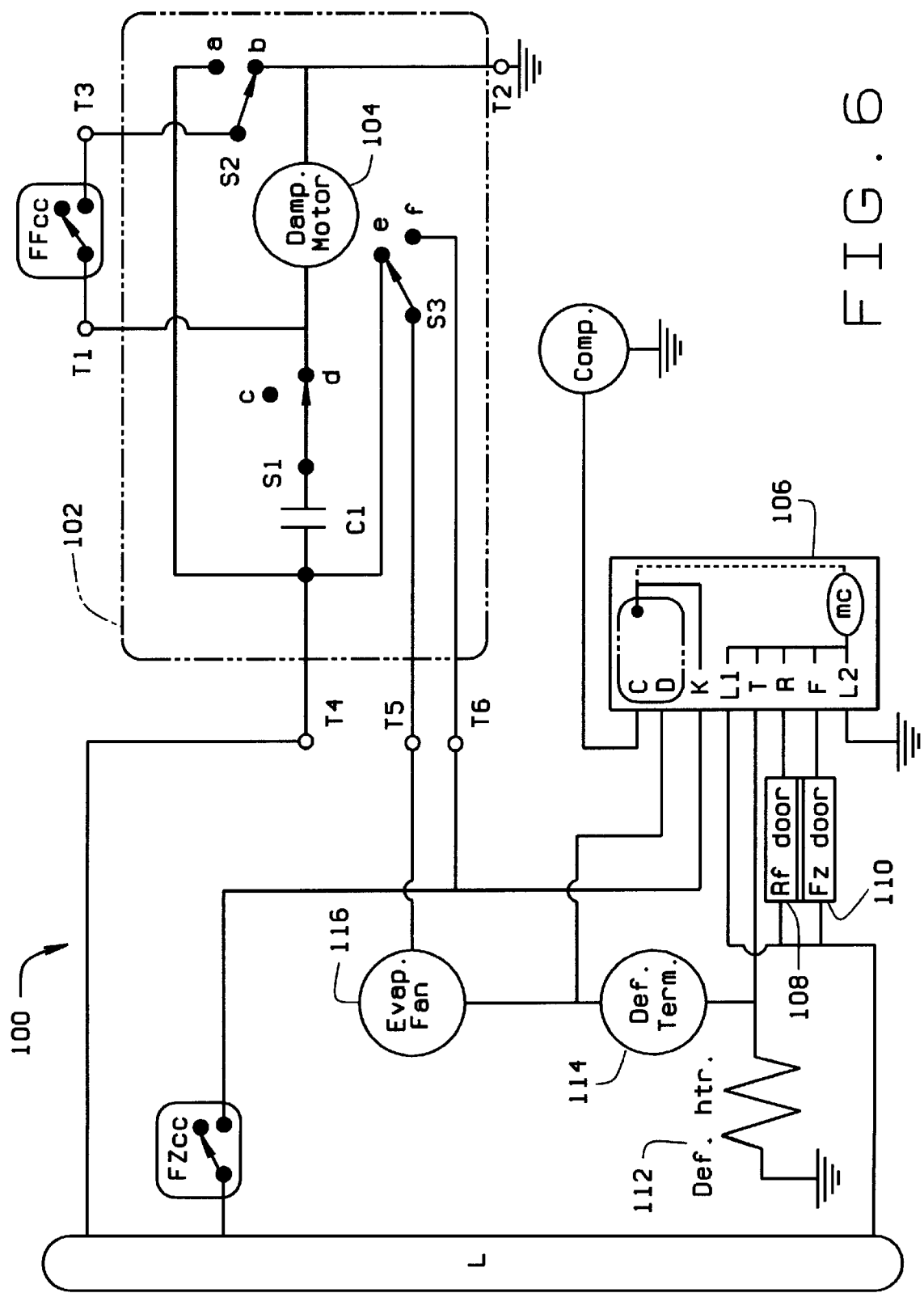
Figure 7:
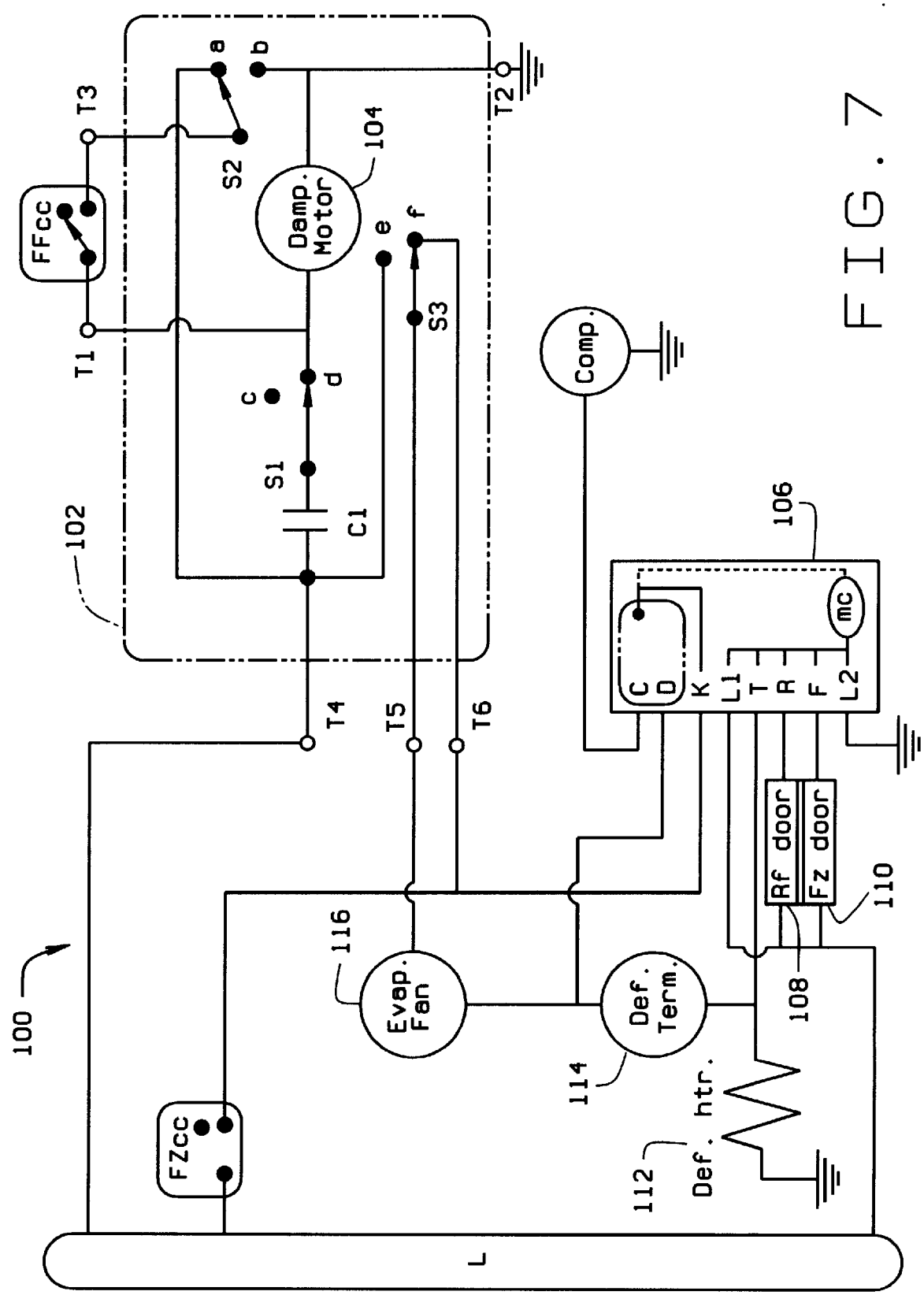

As shown in FIG. 6, when the FFCC thermostat opens, damper motor 104 is energized to rotate the cam to close the damper. While the damper is closing, switch S2 moves to position (a) and switch S3 moves to position (f), as shown in FIG. 7. When the damper door is fully closed, switch S1 will open to position (c) which returns control circuit 100 and damper unit 102 to the stable condition shown in FIG. 2 in which damper motor 104 is de-energized.

Figure 8:
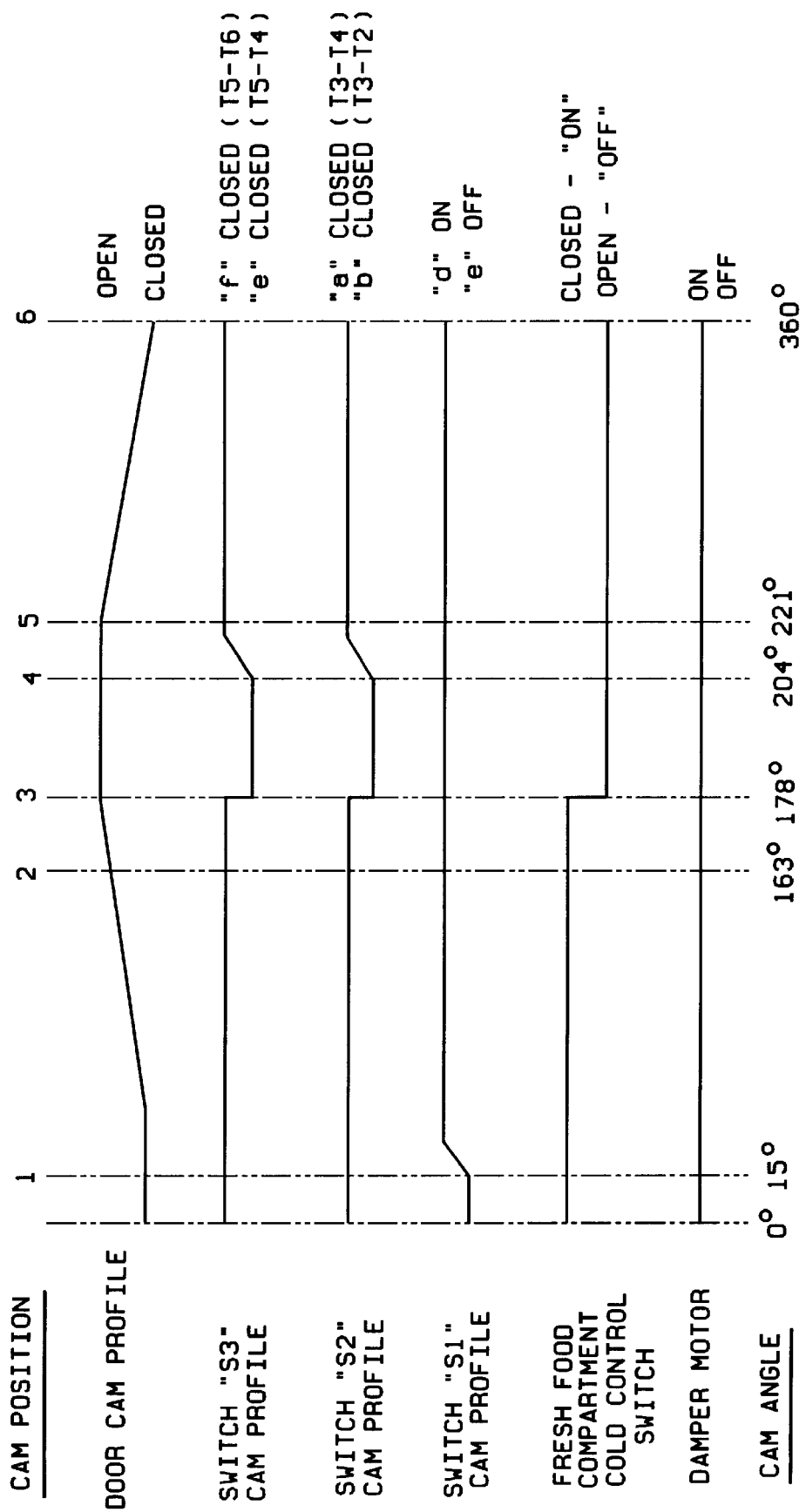
FIG. 8 illustrates the cam positions and cam angles of a cam driven by a damper motor in accordance with one embodiment of the present invention.

FIG. 8 illustrates the cam position and cam angle of the cam driving the damper motor. Using a cam constructed in accordance with the cam profile illustrated in FIG. 8, the switching described above in connection with FIGS. 2–7 can be achieved.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A motorized damper for controlling a temperature of a refrigerator having a freezer compartment and a fresh food compartment, the refrigerator further including a power source and a fresh food cold control thermostatic switch located in the fresh food compartment, said damper comprising:
    a damper motor;
    a capacitor;
    a first switch connected between said capacitor and said damper motor, said capacitor configured to be connected to a power source;
    a second switch connected between the fresh food cold control thermostatic switch and said damper motor; and
    a first circuit path including the fresh food cold control thermostatic switch and said second switch, such that current flows through said first circuit path and energizes said damper motor while by-passing said capacitor.

2. A motorized damper in accordance with claim 1 wherein said capacitor is in series with said first switch.

3. A motorized damper in accordance with claim 1 wherein said first switch comprises first and second contacts and said second switch comprises first and second contact, and said second contact of said first switch is electrically connected to said damper motor and a first terminal, said first terminal configured to be electrically connected to the thermostatic switch.

4. A motorized damper in accordance with claim 3 wherein said second contact of said second switch is electrically connected to said damper motor and to a second terminal configured to be connected to ground, and said second switch is electrically connected to a third terminal, said third terminal configured to be electrically connected to the thermostatic switch.

5. A motorized damper in accordance with claim 3 further comprising a capacitor in series with said first switch and wherein said first terminal of said second switch is electrically connected to said capacitor and to a fourth terminal.

6. A motorized damper in accordance with claim 1 further comprising a capacitor in series with said first switch and a third switch having first and second contacts, said third switch electrically connected to a fifth terminal, said first contact of said third switch electrically connected to said capacitor and to a fourth terminal, and said second contact of said third switch electrically connected to a sixth terminal.

7. Apparatus for controlling a temperature of a refrigerator having a freezer compartment and a fresh food compartment, said apparatus comprising:
    a motorized damper unit comprising a damper motor, a cam connected to said motor, a damper door secured to said cam, and first and second switches electrically coupled to said damper motor and controlled by said cam, said second switch configured to be connected between a fresh food cold control thermostatic switch and said damper motor, a capacitor configured to be connected between the power source and said first switch, a first circuit path including the fresh food cold control thermostatic switch and said second switch, such that current flows through said first circuit path and energizes said damper motor while by-passing said capacitor; and
    a control circuit for controlling energization of said motorized damper, said control circuit comprising the fresh food cold control having an open and a closed position, said damper motor controlled to be synchronized to a state of said fresh food cold control.

8. Apparatus in accordance with claim 7 wherein said first switch is configured to be connected between a power source and said damper motor.

9. Apparatus in accordance with claim 7 wherein said damper unit further comprises a capacitor in series with said first switch.

10. Apparatus in accordance with claim 7 wherein said first switch comprises first and second contacts and said second switch comprises first and second contact, and said second contact of said first switch is electrically connected to said damper motor and a first terminal, said first terminal is electrically connected to said fresh food cold control.

11. Apparatus in accordance with claim 10 wherein said second contact of said second switch is electrically connected to said damper motor and to a second terminal connected to ground, and said second switch is electrically connected to a third terminal, said third terminal is electrically connected to said fresh food cold control.

12. Apparatus in accordance with claim 10 further comprising a capacitor in series with said first switch and wherein said first terminal of said second switch is electrically connected to said capacitor and to a fourth terminal.

13. Apparatus in accordance with claim 10 wherein said damper unit further comprises a capacitor in series with said first switch and a third switch having first and second contacts, said third switch electrically connected to a fifth terminal, said first contact of said third switch electrically connected to said capacitor and to a fourth terminal, and said second contact of said third switch electrically connected to a sixth terminal.

14. A motorized damper for controlling a temperature of a refrigerator having a freezer compartment and a fresh food compartment, the refrigerator further including a power source and a fresh food control thermostatic switch located in the fresh food compartment, said damper comprising:
    a capacitor;
    a damper motor connected to said capacitor;

a first circuit path coupled to said damper motor, said first circuit path comprising a first switch coupled to the fresh food control thermostatic switch, the power source, and said damper motor, said first circuit path configured to allow current to flow through said damper motor and bypass said capacitor.

15. A motorized damper in accordance with claim 14 wherein said capacitor is in series with said first switch.

16. A motorized damper in accordance with claim 14 wherein said first switch comprises first and second contacts, said second contact of said first switch is electrically connected to said damper motor and a first terminal.

17. A motorized damper in accordance with claim 16 wherein said second switch comprises first and second contacts, said second contact of said second switch is electrically connected to said damper motor and to a second terminal configured to be connected to ground, and said second switch is electrically connected to a third terminal, said third terminal configured to be electrically connected to the thermostatic switch.

18. A motorized damper in accordance with claim 17 wherein said first terminal of said second switch is electrically connected to said capacitor and to a fourth terminal.

19. A motorized damper in accordance with claim 14 wherein said capacitor is in series with said first switch and a third switch having first and second contacts, said third switch electrically connected to a fifth terminal, said first contact of said third switch electrically connected to said capacitor and to a fourth terminal, and said second contact of said third switch electrically connected to a sixth terminal.

\* \* \* \* \*